Oct. 6, 1931. H. O. LOEBELL 1,826,007
APPARATUS FOR MANUFACTURING COMBUSTIBLE GAS
Filed Dec. 7, 1923 3 Sheets-Sheet 1

Fig.1.

Oct. 6, 1931.  H. O. LOEBELL  1,826,007
APPARATUS FOR MANUFACTURING COMBUSTIBLE GAS
Filed Dec. 7, 1923  3 Sheets-Sheet 3

Henry O. Loebell Inventor
By His Attorney
Edmund G. Borden

Patented Oct. 6, 1931

1,826,007

UNITED STATES PATENT OFFICE

HENRY O. LOEBELL, OF NEW YORK, N. Y., ASSIGNOR TO HENRY L. DOHERTY, OF NEW YORK, N. Y.

APPARATUS FOR MANUFACTURING COMBUSTIBLE GAS

Application filed December 7, 1923. Serial No. 679,133.

This invention relates to the manufacture of fuel gas and more particularly to apparatus for making gas for industrial purposes by the complete gasification of coal.

The present invention constitutes an improvement on the method and apparatus for manufacturing fuel gas shown and described in my co-pending application, Serial No. 640,828, filed May 23, 1923.

In the above application a process and apparatus are shown for making a new, efficient and economical type of industrial gas which has properties making it a valuable improvement on the various kinds of producer gas and blue gas commonly burned for industrial heating purposes. The process as carried out in the apparatus shown consists essentially in charging fuel, preferably a mixture of coal and coke, into the top of a shaft generator, passing the fuel in a column slowly downwardly through the generator, subjecting the column of fuel to a series of heat treatments during its downward passage whereby it is partially consumed, and removing the unconsumed fuel and the ash from the bottom of the fuel column. In its passage through the upper portion of the generator the coal in the fuel column is heated and then carbonized by a heat transfer with a countercurrent circuit of a portion of the lean gases generated further down in the shaft, and the volatile products of the coal distillation are removed together with the cooled producer gases from the top of the generator. In the mid portion of the generator the coke originally in the fuel together with the coke product of the coal carbonization is subjected to an upwardly flowing continuous blast of preheated air and steam introduced around the periphery of the fuel column, whereby the coke is partially consumed with the generation of producer gas. A major portion of the hot producer gas thus generated is removed directly from the hot mid zone through a central offtake mounted in the top of the generator with its intake in approximately the central axis of the shaft, somewhat above the plane of the circumferential blast inlet and adjacent the hot mid portion of the fuel column. The part of the fuel column which has passed this high temperature zone is subjected to the cooling and quenching action of a counter current water vapor circuit, whereby the fuel is cooled before being removed from the furnace. The column of fuel is supported in the shaft by a movable discharging device, and since in using a circumferential blast and a central gas offtake combustion will be carried on more rapidly in the outer than in the inner sections of the charge, means are provided to act in combination with the discharging device in removing fuel peripherally from the bottom of the column.

In the invention outlined above the volume of the high temperature gasifying zone is somewhat restricted for the reason that the blast gases are introduced into the fuel column through a circumferential inlet and are forced to follow approximately a direct path toward a central offtake, in a diagonal direction both countercurrent and at right angles to the general movement of the fuel charge. Thus the fuel treating and gas making capacity of the process and apparatus forming the subject matter of the above invention is limited because of the restricted high temperature zone.

In operating the above process as well as in carrying out all other gasification processses so far as known, it has been customary to discard the fine portion of the unconsumed fuel known as coke breeze as a waste product, because of the great difficulty encountered in working out a commercially practicable method of utilizing its very considerable heat energy.

The primary object of the present invention is to provide apparatus for manufacturing industrial fuel by which larger volumes of fuel may be gasified per unit of time than heretofore.

Accordingly, one feature of the present invention contemplates passing the blast gases downwardly into the central portion of the fuel column in the same direction as that in which the charge is moving, and in a manner such that the path of travel of the blast gases and of the gas generated in the high temperature zone of the fuel column thereby, is greatly extended in both length and breadth. This extension of the path of the blast gases results in a greatly enlarged high temperature zone in the blast portion of the fuel column, and thus permits a corresponding increase in the fuel treating and gas making capacity of the operation, without affecting adversely the quality of the products. The advantage shown in the aforementioned application of having a thorough penetration of the blast gases throughout each cross section of the charge is insured in the present invention, but the point of highest concentration of consumed fuel occurs in the axial portion of the high temperature zone in the present process, while according to the process described in the aforementioned application the highest concentration of ash would be found in the peripheral portion of the blast zone of the fuel column.

The type of gas formed according to the present process is identical with that shown and described in the aforementioned application. However, since the concentration of consumed fuel according to the present invention will be much greater in the axial than in the peripheral portion of the charge, in order to obtain a uniform solid product from the operation it will be necessary to vary the rate of gasifying the fuel and the rate of passing the fuel through the axial and the peripheral sections of the gasifying zone of the column, so as to counterbalance the concentrating effect of the central blast. Accordingly, a further object of the present invention is to provide apparatus for manufacturing industrial gas by which the rate of gasifying fuel may be controlled, and the rate of moving fuel through the section of the apparatus in which it is gasified may be so regulated as to be approximately proportional to the rate at which its gasification proceeds.

Another object of the present invention is to provide apparatus for manufacturing gas by which fuel may be moved through the section of the apparatus in which it is gasified at such a rate that it is consumed to a uniform degree as it leaves the gasifying section.

Accordingly, another feature of the present invention is a device combining the properties of a fuel supporting and fuel discharging means, whereby the column of fuel is supported in the shaft and the fuel in the axial portion of the column is advanced through the high temperature zone at a much faster rate than the fuel in the peripheral portions of the column. By passing the fuel in the axial portion of the column through the comparatively thick central section of the high temperature zone at a rapid rate, and at the same time advancing the fuel in the peripheral portion of the column through the thin peripheral section of the high temperature zone at a much slower rate, and by controlling the rate of advancement through each section so as to make it proportional to the thickness of the section, the fuel in every portion of the column is permitted to remain in contact with the blast gases for about the same period of time and is thereby approximately uniformly consumed at the time it leaves each section of the high temperature zone.

Another object of the present invention is to provide apparatus for manufacturing industrial gas by which fuel may be completely and economically gasified.

Accordingly, another feature of the present invention includes devices by which the coke fines or breeze heretofore discarded can be economically gasified by carrying them with the blast gases into the high temperature zone of the fuel column.

With these and other objects and features in view, the invention consists in the improved gas making apparatus hereinafter described and specifically defined in the claims.

The various features of the invention are illustrated in the accompanying drawings in which:

Fig. 2 is a detailed vertical sectional view taken on the line 2—2 of Figure 3, illustrating the mechanism for removing coke and ash from the bottom of the generator;

Figure 1:
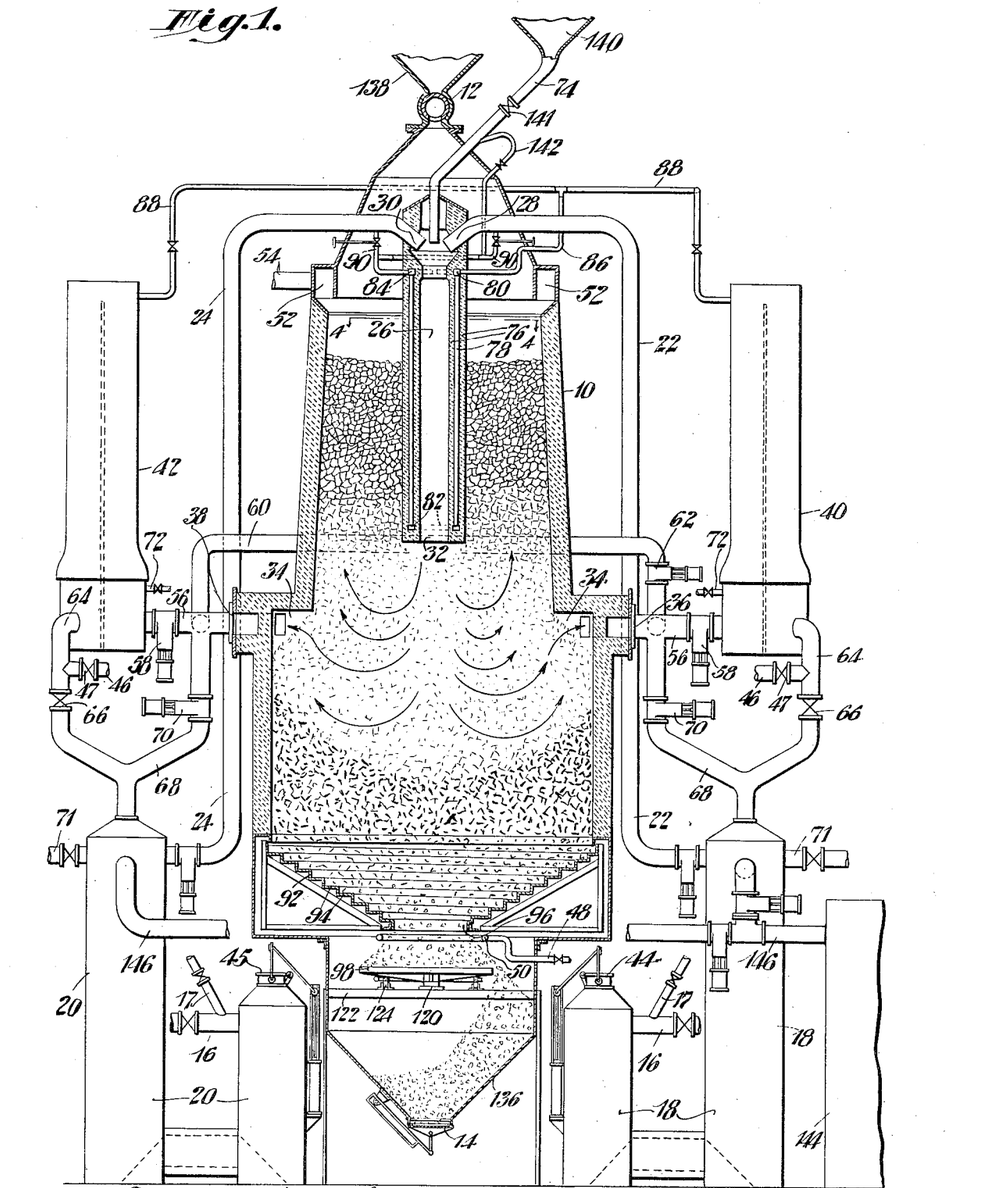
Fig. 1 is a view in vertical section with parts in elevation of a gas generator embodying the preferred form of the invention.

To carry out the preferred process of the present invention in the apparatus illustrated in the drawings, fuel is passed in a column downwardly through a shaft generator 10, Fig. 1, the fuel being periodically admitted to the generator through a charging gate 12 and unburned fuel and ash being intermittently discharged from the generator through an outlet gate 14. Gas is produced from the fuel by continuously blasting a mixture of air and steam or other combustion supporting gases through the fuel column. The air for blasting enters conduits 16 where it is mixed with steam from pipes 17 and the mixture passes into the auxiliary section of one of a pair of regenerators 18 or 20, then flows downwardly and then upwardly through the main section of the regenerator, and passes through a vertical flue 22 or 24 into a central blast tube 26, through one of the downwardly projecting nostrils 28 or 30. The blast air and steam mixture passes downwardly through the central tube and enters the central portion of the fuel column through a blast inlet 32. A major portion of the blast exhaust gases pass out of the fuel column hot through a circumferential offtake 34 and one or both of the offtake nostrils 36 or 38 into one of a pair of waste heat boilers 40 or 42, and thence into one of the regenerators 18 or 20, where the heat of combustion of the gases is absorbed and the gases exhaust comparatively cool through outlet gates 44 or 45.

In case it is found advantageous to store the producer gas thus generated and to heat the regenerators by other means, or in case there is an excess supply of said gas above that necessary to furnish the heat for carrying on the operation, connections 46 provided with standard valves 47 are provided whereby the cooled producer gas may be passed from the waste heat boilers directly to a gas holder.

When the heat of exhaust gases has built up the temperature of one regenerator, the incoming air is reversed to admit the air through the heated regenerator and exhaust the blast gases through the regenerator previously used for preheating the air.

Refractory tile or metal recuperators built to withstand high temperatures may be used in place of the regenerators shown for preheating the blast gases, and in case recuperators are used it is probable that one large unit would replace the two regenerators 18 and 20.

A heat transferring gas, generally saturated steam, is led into the generator through an inlet 48 near the bottom of the generator, and is distributed from a coil 50 in such a way that it passes upwardly through every part of the fuel column countercurrent to the movement of fuel in the column. The gas or steam enters the fuel column in a comparatively cool condition and acts to absorb heat from the coke and ash in the lower portion of the column and carry the heat toward the hot mid-portion. A part of the gas generated by the blast air and the steam in the hot mid-portion of the fuel column is passed upwardly through the fuel in the upper portion of the column, imparting heat thereto and gradually carbonizing the coal therein. The products of distillation of the coal are carried off along with the current of producer gas from the hot mid zone, and the mixtures of enriched gases leaves the column in a comparatively cool state through a circumferential offtake 52 and a rich gas main 54. With a careful regulation and division of the centrally introduced blast gas, the heat transferring gas, and the rate of passage of the fuel downwardly through the generator, the temperature in the fuel column may be controlled so that the fuel will enter and leave the column in a comparatively cooled state, the gases passing upwardly through the fuel column will enter and leave the column comparatively cool, and the blast gas will enter and leave the heat regenerator in a comparatively cool state. Throughout the operation, therefore, heat is always recovered from the products being removed from the generator and returned to the hot mid-portion of the column to be utilized in the carbonization of coal and the production of gas.

The two waste heat boilers 40 and 42 are designed to recover and utilize the sensible heat in the exhaust blast gases in generating steam. The waste heat boilers have exhaust gas connections with the offtake nostrils 36 and 38 by pipes 56, which are provided with hot valves 58, and the pipes 56 are connected by a conduit 60, provided with a hot valve 62, Fig. 1, so that the hot exhaust gases may be drawn through either or both the offtake nostrils into either of the waste heat boilers. The gases pass upwardly through one section of the waste heat boilers, and downwardly through another section, being cooled by a heat transfer to water tubes, and the cooled exhaust gases are then passed through a conduit 64 and a valve 66 into the combustion chamber of the corresponding regenerator 18 or 20, where they are burned and their heat of combustion recovered. The hot exhaust gases may be passed directly from the offtake nostrils to the combustion chamber of the regenerator, by closing the valve 58 and passing the gas through a conduit 67 and a hot valve 70. Sufficient air to burn the exhaust blast gases may be introduced into the regenerator through an inlet 71. Water is introduced into the waste heat boilers through inlet pipes 72, and steam generated in the waste heat boilers may be introduced into the air conduit 16 at the top of the vaporizing elements of the regenerators through the pipes 17.

Figure 4:
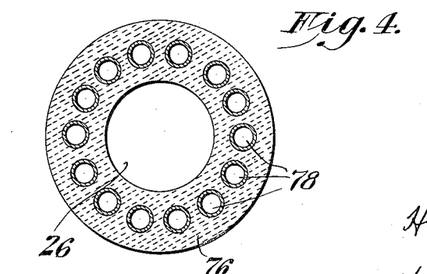
Fig. 4 is a horizontal sectional view showing the central blast inlet, taken on the line 4—4 of Fig. 1 and, Fig. 5 is a plan view of the lower part of the coke discharging mechanism taken on the section 5—5 of Fig. 2.

The central blast inlet 26 is similar in construction to the central offtake 20 shown and described in my co-pending application, Serial No. 640,828, filed May 23, 1923. The blast inlet tube 26 is supported on the top of the shaft 10 by the inlet pipes 28 and 30 and by a chute 74, and consists essentially in a hollow superheater with an inner and outer refractory lining 76. The superheater consists of a series of superheating tubes 78, which are connected between an inlet manifold 80 at the top, a distributing manifold 82 at the bottom, and an outlet manifold 84 at the top. See Figs. 1 and 4. The superheater is protected by an inside and outside lining of refractory material, the object of the superheater being to keep the refractory lining cool enough to prevent its disintegration by the hot blast gases. The inner refractory lining of the blast inlet affords a free smooth faced passage for the blast gases, and protects them from any serious loss of heat during their passage therethrough. The steam to be superheated is introduced into the inlet manifold 80 through a pipe 86 which connects with a steam header 88, mounted between the waste heat boilers 40 and 42. The superheated steam is conducted from the outlet manifold 84 to the blast air inlet pipes 28 and 30 through pipes 90, and the mixture of superheated steam and preheated air is blasted continuously downward into the center of the fuel column through the central tube 26 and blast inlet 32.

By blasting the mixture of preheated air and steam downwardly into the center of the fuel column, the high temperature zone created in the central portion of the column by the reactions which take place between the carbon of the fuel and the blast gases has an approximately elliptical shaped cross section. The offtake nostrils 36 and 38 are at opposite ends of this elliptical shaped section, while the central portion extends from the blast inlet 32 to a point in the central axis of the shaft some distance below the blast inlet and in a plane lying considerably below the plane of the offtake nostrils; (see Fig. 1 and the arrows illustrating the path of the blast gases and the producer gas generated thereby). The high temperature zone comprises a comparatively large part of the central portion of the fuel column, therefore, and its greatest vertical width is in approximately the central axis of the column. It follows from this that the greatest concentration of consumed fuel or ash will be found in the central axis of the shaft, and that if the fuel consumption is to be uniform throughout the whole cross section of the column, the fuel in the central axis of the column must be advanced through the generator at a faster rate than that in the peripheral portions of the column.

To accomplish this, the column of fuel is supported in the shaft by a movable bottom positioned in the lower portion of the shaft, and arranged to discharge material from the foot of the column only through a central opening therethrough. This bottom (see Figs. 2 and 3) consists of a large hopper 92 having a series of helically sloped steps 94 forming its inner wall. In the bottom of the hopper is a centrally located opening 96, through which material may fall, but the material passing through the opening 96 is caught by a movably mounted table 98 which is positioned below the hopper bottom and has a top area larger than the area of the hopper opening 96, and thus affords in combination with the hopper 92 a positive support for all the material in the shaft. Four bearings 100 are mounted on a supporting frame 101 at regular intervals about the circumference of the outer wall of the hopper 92, and each of these bearings carries a radially extending axle 102 to which is keyed a flanged wheel 104. The wheels 104 engage with a circular track 106 which is supported by brackets 107 attached to the framework of the generator wall, and the track and the wheels 104 and axles 102 carry the whole weight of the hopper 92, together with the weight of fuel supported by the hopper. A circular rack 108 is secured to the outer rim of the hopper, and the teeth on this rack are arranged to engage with the teeth of a worm pinion 110. The pinion 110 is keyed to a shaft 112 which passes through a packing gland 114 in the generator shell and is rotated by a motor or other source of power outside the shaft. The shaft is supported and the pinion is held in mesh with the rack by means of bearings 116, and as the shaft revolves, the motion is transmitted by the pinion and rack combination to the hopper, causing it to rotate slowly on the supporting track 106. A circular angle iron 118 is mounted flush with the inner wall of the generator and forms an apron overlapping the upper edge of the hopper, thus preventing any material from falling over the top of the hopper. As the hopper revolves it will be seen that the fuel in all sections of the column supported by the hopper will be advanced downwardly and inwardly toward the central opening 96, and that the rate at which the fuel in each annular section of the column is advanced will be roughly inversely proportioned to the distance at which it lies from the central axis of the shaft. Since the percentage of fuel consumed in the high temperature zone of the generator is also approximately inversely proportioned to its distance from the central axis, it follows that the rate of advancement of the fuel is so regulated that the concentration of consumed fuel leaving the high temperature zone will be about uniform throughout the whole cross section of the shaft, and by varying the speed of rotation of the hopper and table 98 the amount of fuel passed through the shaft unconsumed may be very closely regulated.

Figures 2, 5:
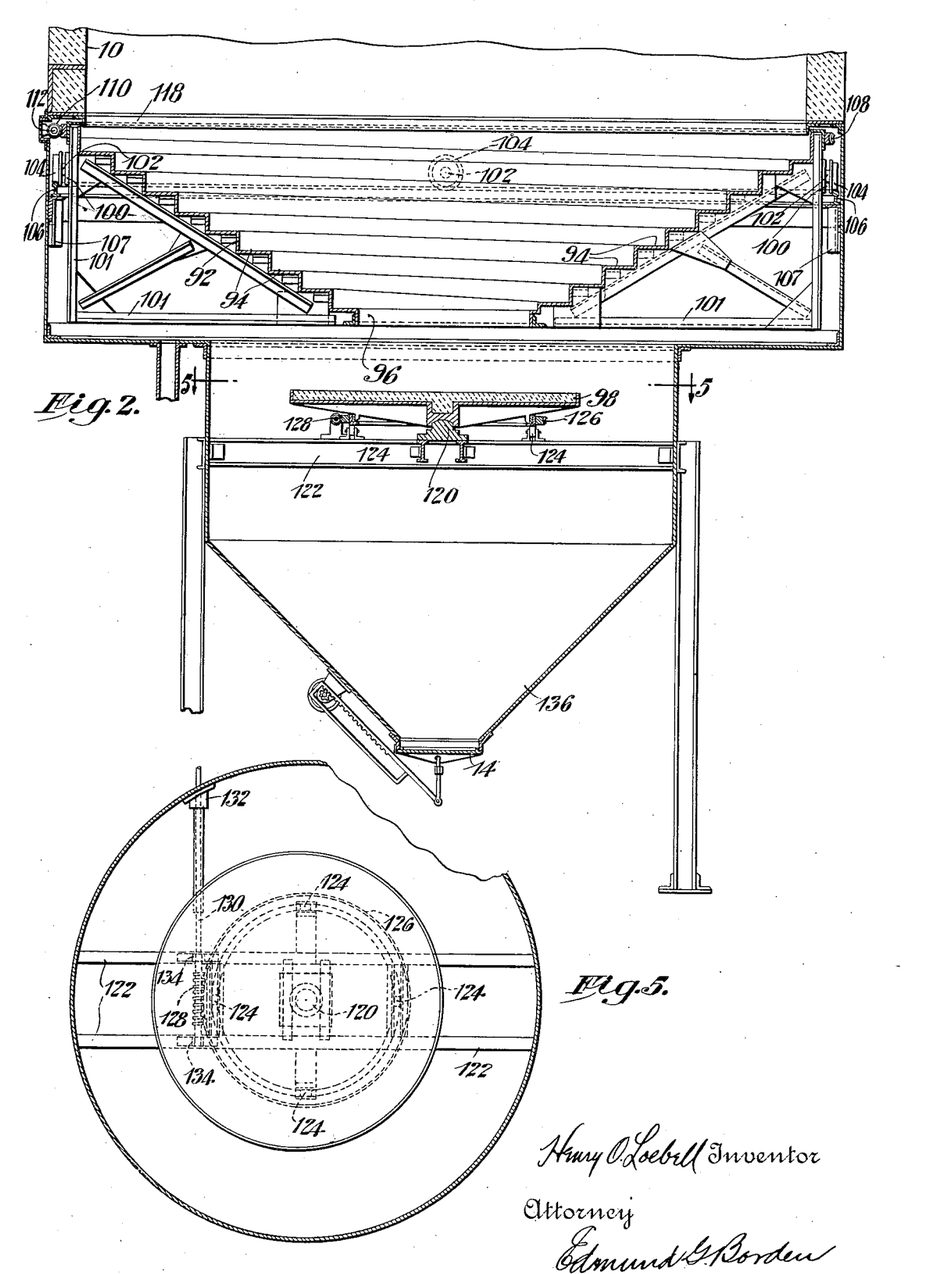
Figure 3:
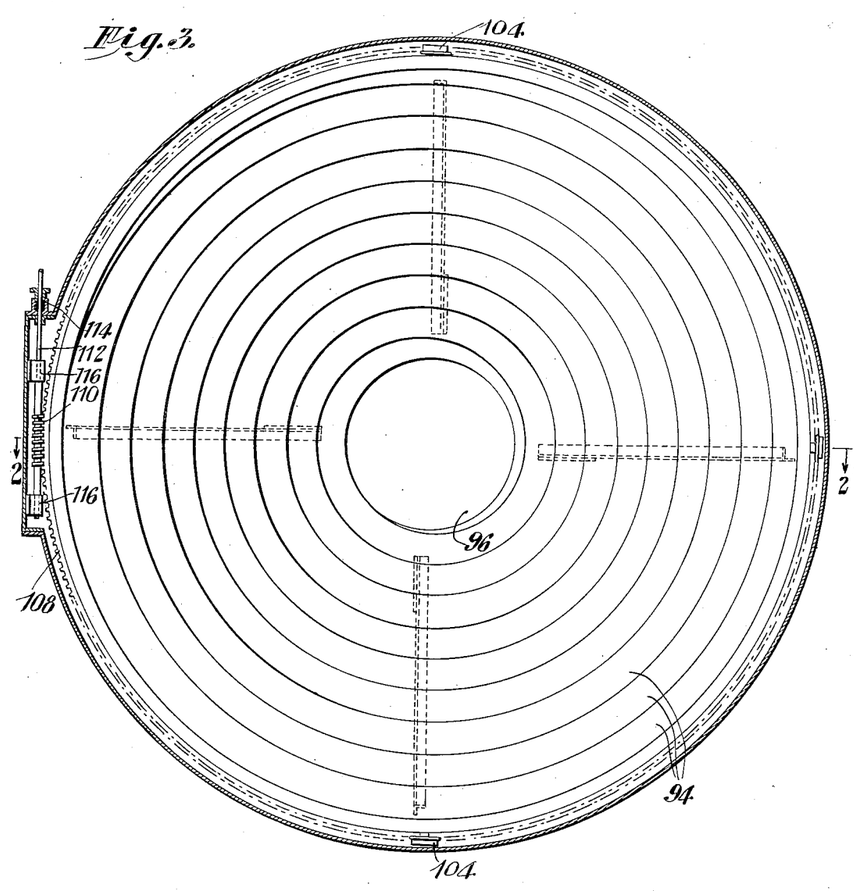
Fig. 3 is a plan view illustrating the coke discharging mechanism.

The table 98 is set eccentrically of the hopper opening 96 on a central supporting bearing or turntable 120, and this bearing is in turn supported by cross beams 122, (see Figs. 2 and 5). Four nests of rollers 124 are also carried by the beams as additional supports and balances for the table. A circular rack 126 is secured to the lower side of the table near its outer rim, and a worm pinion 128 which is keyed to a shaft 130 is provided with teeth which are adapted to engage with the teeth on the rack. The shaft 130 passes through a stuffing box 132 in the shaft lining, and is connected to a motor or other source of power outside the shaft. The shaft is supported by bearings 134 erected on the girders 122, and these bearings also serve to hold the worm in engagement with the teeth of the rack. The rotation of the shaft 130 is transmitted through the worm and rack, causing the table to revolve about the central bearing, and due to this motion and the eccentric mounting of the table, the fuel is forced over the edge of the table and falls into a hopper 136 forming the bottom of the shaft. The principal role of the table 98 is to act as a support for the central section of the fuel column and to control the rate of removal of fuel from the bottom of the column.

The fuel is removed at intervals from the hopper 136 by opening the sealed gate 14. This fuel as it is removed through the gate 14 consists of a mixture of varying proportions of coke, coke breeze and ash, which has been quenched in its passage through the lower portion of the generator by a current of steam or water distributed through the fuel by the coil 50. The mixture is screened, and the separated coke passing over the screen is elevated to the top of the shaft and after being mixed with coal is placed in a hopper 138 and passes from the hopper through the gate 12 into the top of the shaft. By mixing the coke with the coal charged into the hopper, the porosity of the fuel bed is increased.

One of the objects of passing the charge mixture through the shaft at a faster rate than the fuel is consumed is to maintain a sufficiently large proportion of unburned carbon in the waste fuel passing the high temperature blast zone of the fuel column so as to substantially prevent fusing of the ash into clinker.

The screened mixture of fine coke breeze and ash obtained in the coke separating operation has heretofore usually been wasted. However, one purpose of the present invention is to recover this fine coke which comprises a very considerable proportion of the mixture passing through the screen, and to utilize it in the gas making operation. To do this the mixture is preferably run through some type of crusher where it is crushed to a fine size, and the breeze is separated from the ash by one of the usual gravity hydraulic or air blast selective treatments. The fine coke or breeze, after drying if necessary, is elevated to the top of the shaft and is dumped into a hopper 140. The chute 74 connects the bottom of this hopper with the central blast tube 26. This chute is provided with a gate valve 141, and the amount of breeze which is passed through the chute from the hopper 140 to the tube 26 per unit of time is accurately controlled by this valve. A connection 142 with the superheater steam pipe 90 is set in the chute below the valve 141, and may be utilized as an injector for carrying the breeze forward into the blast tube. The mouth of the chute 74 is directly in front of the blast nostrils 28 or 30, so that the fine breeze is picked up by the blast air and steam entering through the nostrils and is carried forward with greatly accelerated velocity through the blast tube and the inlet 32 into the central portion of the fuel charge. Since the breeze is in a finely divided condition and is in direct contact with the preheated blast gases, it is consumed almost at the instant it enters the high temperature blast zone, and the consumed fuel is continuously moved away from the blast inlet 32 by the downwardly moving column of fuel, thus allowing a continuous blast of breeze to be blown into the fuel without obstructing the passage of the blast gases.

The use of some device such as that shown, whereby the coke breeze or other difficultly burnable material may be introduced at high temperature into a hot bed of fuel in such a manner as to prevent the clogging up of the apparatus with ash and clinkers, is apparently a prerequisite for commercially feasible operation. The great difficulty encountered heretofore in burning material of this nature has been in raising it to ignition temperatures while at the same time holding it in a porous condition for the easy penetration of blast gases. It will be obvious, for instance, that if the fine breeze were introduced into a fuel bed at low temperature or in a direction at right angles or countercurrent to the direction of movement of the fuel, clinkers and ash would quickly accumulate, and would clog up the blast inlet almost immediately.

In order to supplement the exhaust blast gases in heating the regenerators, a stoker 144, adapted to burn coke or waste fuel is provided (see Fig. 1). This stoker may be equipped with traveling grates, and has hot gas connections 146 with each of the regenerators 18 and 20.

As previously stated a new, efficient and economical type of industrial gas can be prepared by operation in accordance with the present invention.

A typical analysis of the gas made by the present process is substantially as follows:

Per cent
$CO_2$ ------------------------------------- 7
$N_2$ -------------------------------------- 40
$CO$ -------------------------------------- 24
$H_2$ -------------------------------------- 25
$CH_4$ ------------------------------------- 4

In other words by imparting a high degree of preheat to the blast mixture of air and steam and by preheating the fuel it is possible by the present method of operation to obtain a thermal heat balance while at the same time producing a gas having a total inert content of from only 45-52%, and by enriching only that portion of the gas produced which is not used for keeping up the heats in the preheating equipment, with the gaseous products of fuel carbonization, it is possible to produce at very low cost a gas having a calorific value of 200—225 B. t. u.'s and having most of the advantageous properties of water gas. The products of combustion of this gas have a calorific value of 80—90 B. t. u.'s per cu. ft. In addition to having a lower inert content than the normal type of producer gas the industrial gas made in accordance with the present invention is characterized by the presence of a substantially large volume of methane and also possesses a relatively high percentage of carbon monoxide and hydrogen, all of which constituents impart to the final product the properties of high flame temperature and relatively high flame propagation. As this gas is identical with that particularly described in my aforementioned application, Serial No. 640,828, reference is hereby made to said application for a more detailed description of its specific characteristics and properties.

The generator illustrated in the present application together with the other devices and appurtenances not particularly described herein have substantially the same construction and mode of operation as the same parts which are shown and particularly described in my previous applications, in particular in my co-pending application Serial No. 640,828, filed May 23, 1923, and reference is hereby made to said application for a detailed description of the construction and mode of operation of these various parts.

The term "radially" has been used in the specification and in some of the claims to define the manner in which blast air admitted into the central axis of the fuel column diverges in all directions toward the periphery of the column. Likewise the term "corradially" has been used in the specification and in some of the claims to define the manner in which the fuel and ash advancing through the lower portions of the column converges from the peripheral sections toward the central discharge opening in the hopper 92.

The preferred form of the invention having been thus described, what is claimed as new is:

1. In a gas generator, an upright gas generating shaft, means for introducing solid fuel into the top of the shaft, a blast introducing member mounted in approximately the central axis of the shaft with an outlet into the mid-portion of the shaft, means for concurrently introducing solid fuel and air into said blast introducing member, means positioned in the bottom of said shaft for supporting a column of solid fuel therein and means for removing fuel and ash corradially from the bottom of said column.

2. In a gas generator, a gas generating shaft, means for introducing solid fuel into the top of the shaft, separate means for introducing solid fuel into the mid-portion of the shaft, means for removing fuel and ash from the bottom of the shaft, means positioned in the lower portion of the shaft for supporting a column of solid fuel therein, and means combined with said fuel supporting means for advancing fuel through the shaft.

3. In a gas generator, an upright gas generating shaft, means positioned in the lower portion of the shaft for supporting a column of solid fuel in said shaft and for moving the fuel through the shaft, a blast introducing member mounted in the central axis of the shaft with an outlet adjacent the mid-portion of the shaft, a gas offtake at the top of the shaft, and an independent circumferential gas offtake connected to the mid-portion of the shaft.

4. In a gas generator, an upright gas generating shaft, means positioned in the lower portion of the shaft for supporting a column of solid fuel in the shaft and for discharging fuel and ash axially therefrom, a blast introducing member suspended axially from the top of the shaft having an outlet to the mid portion of the shaft, a circumferential lean gas offtake connected to the mid portion of the shaft, a separate circumferential rich gas offtake connected to the upper portion of the shaft, a waste heat boiler connected with the lean gas offtake, preheaters connected to the waste heat boiler and the blast introducing member, means for introducing gas and air for combustion into the preheaters, means for introducing into a preheater a mixture of air and steam to be heated, and means for cutting off one preheater from the blast introducing member when the other preheater is used to preheat the mixture being introduced into the generator.

5. In a gas generator, an upright gas generating shaft, means positioned in the lower portion of the shaft for supporting a column of solid fuel therein, and for continuously advancing the fuel in the respective axial and peripheral portions of the said column at varying rates therethrough, a blast introducing member mounted longitudinally in the shaft and having an outlet opening into the shaft adjacent a mid portion thereof, a steam superheater operatively connected with the blast introducing member, a preheater communicating with the last mentioned member, a coke hopper operatively connected with the said blast introducing member, and separate means for simultaneously conducting air from the preheater, steam from the superheater, and coke breeze from the coke hopper into and through the blast introducing member.

6. In a gas generator, an upright gas generating shaft, a blast introducing member axially disposed in the upper portion of the shaft with an outlet adjacent the mid portion of the shaft, said introducing member comprising essentially a steam superheater with outside and inside refractory linings and a hollow central passageway, means for introducing coke breeze into said passageway, and means for introducing preheated air and superheated steam into said passageway and thence through the outlet into the shaft.

7. In a gas generator, a stationary gas generating shaft, a solid fuel charging device in the top of the shaft, a fuel and ash discharging device at the bottom of the shaft, and a movable false bottom positioned in the lower portion of the shaft above said discharging device for positively supporting a column of solid fuel in the shaft and for advancing the fuel therethrough comprising two elements vertically spaced from each other and movable independently of each other.

8. In a gas generator, an upright stationary gas generating shaft, a solid fuel charging device at the top of the shaft, a fuel and ash supporting and discharging device in the lower portion of the shaft and a movable false bottom disposed in the lower portion of the shaft above the said discharging device for supporting a column of fuel in the shaft and for advancing the fuel therethrough, the said false bottom comprising a movable hopper with an open bottom and a movable platform vertically spaced from and positioned directly beneath said hopper bottom.

9. In a gas generator, a stationary gas generating shaft, a solid fuel charging device at the top of the shaft, and a fuel and ash discharging device in the lower portion of the shaft for supporting a column of fuel therein and for advancing the fuel therethrough, the last named means comprising an open ended rotatable hopper having its sides converging stepwise downwardly, and a movable platform member positioned below the opening in the said hopper.

10. A gas generator as defined in claim 9 in which the converging walls are helically-stepped downwardly.

11. In a gas generator, a gas generating shaft, a hopper with a sealed discharge gate forming the bottom of said shaft, a second hopper which is movably mounted and has an open bottom, positioned in the lower portion of the shaft above the bottom hopper and forming a false bottom for said shaft, a centrally disposed movably mounted horizontal table beneath said open hopper bottom and vertically separated a substantial distance therefrom, means for rotating said false bottom, and separate means for rotating said horizontal table.

12. In a gas generator, a gas generating shaft, a solid fuel and ash supporting and discharging means positioned in the lower portion of the shaft, said means comprising an open ended hopper movable with respect to the said shaft and having its side walls converging downwardly in the form of helical steps, a plurality of rotatable supporting members mounted upon the outer wall of the said hopper, a curved supporting member cooperating with the inner wall of the shaft to support the said rotatable supporting means, a rack mounted on the outer wall of the hopper and adapted to engage a driven member for positive coaction therewith, the said driven member being operatively connected with a source of power outside of the shaft.

13. In a gas generator, a gas generating shaft, and a solid fuel and ash supporting and discharging means positioned in the lower portion of the shaft comprising a movable hopper with an open bottom mounted on a number of peripherally attached wheels and carried by a circular supporting track, and a movable circular table with a surface area considerably larger than the area of the hopper bottom mounted eccentrically on a centrally located bearing beneath said hopper bottom.

14. In a gas generator, a gas generating shaft, means positioned in the lower portion of said shaft for supporting a column of solid fuel in said shaft, for agitating said fuel, and for removing fuel from the bottom of the column, comprising a movably mounted hopper with an open bottom and a movably mounted platform beneath said hopper bottom and vertically spaced therefrom, means for rotating said hopper, and independent means for rotating said platform, both said means being so arranged as to separately control the speed and direction of rotation of said hopper and said platform.

15. In a gas generator, a gas generating shaft, a movable mounted false bottom positioned in the lower portion of the said shaft and comprising an open ended hopper having a series of helically stepped side walls, the said hopper being carried by wheels on a circular track supported by the wall of the shaft, means for rotating the said hopper with respect to the said shaft, and a movably mounted platform beneath the lower end of the said hopper and designed to cooperate with the hopper for supporting a column of solid fuel in the shaft, for advancing the fuel therethrough, and for discharging fuel and ash from the bottom of the column.

16. In a gas generator, a gas generating shaft, a movable fuel supporting and discharging means positioned in the lower portion of the shaft comprising a movably mounted hopper with an open bottom, means for rotating said hopper, an eccentrically mounted horizontal platform spaced from and directly beneath said hopper opening, a bearing supporting said platform in about the central axis of the shaft, a circular rack attached to the lower side of said platform, and means connected to a source of power outside of the shaft and adapted to engage with the teeth of said rack to rotate the platform about its central supporting bearing.

In testimony whereof I affix my signature.

HENRY O. LOEBELL.